(12) United States Patent
Zeng et al.

(10) Patent No.: US 7,359,538 B2
(45) Date of Patent: *Apr. 15, 2008

(54) DETECTION AND ANALYSIS OF LESIONS IN CONTACT WITH A STRUCTURAL BOUNDARY

(75) Inventors: Xiaolan Zeng, Santa Clara, CA (US); Wei Zhang, Union City, CA (US)

(73) Assignee: R2 Technology, Sunnyvale, CA (US)

( * ) Notice: Subject to any disclaimer, the term of this patent is extended or adjusted under 35 U.S.C. 154(b) by 490 days.

This patent is subject to a terminal disclaimer.

(21) Appl. No.: 10/261,184

(22) Filed: Sep. 30, 2002

(65) Prior Publication Data

US 2003/0099384 A1 May 29, 2003

Related U.S. Application Data

(63) Continuation-in-part of application No. 09/993,789, filed on Nov. 23, 2001.

(51) Int. Cl.
*G06K 9/62* (2006.01)
*A61B 10/00* (2006.01)

(52) U.S. Cl. .................. 382/131; 382/173; 382/199; 382/257; 128/922

(58) Field of Classification Search .............. 382/128, 382/130, 131, 132, 173, 199, 257, 270; 378/62; 128/922; 878/98.6, 98.9; 345/418, 419, 619, 345/647
See application file for complete search history.

(56) References Cited

U.S. PATENT DOCUMENTS

| | | | | |
|---|---|---|---|---|
| 5,257,346 A | * | 10/1993 | Hanson | .................. 345/582 |
| 5,757,953 A | * | 5/1998 | Jang | ..................... 382/132 |
| 5,881,124 A | * | 3/1999 | Giger et al. | .................. 378/8 |
| 5,982,917 A | * | 11/1999 | Clarke et al. | ............... 382/132 |
| 6,058,322 A | * | 5/2000 | Nishikawa et al. | ......... 600/408 |
| 6,078,680 A | | 6/2000 | Yoshida et al. | |
| 6,125,194 A | * | 9/2000 | Yeh et al. | .................... 382/132 |
| 6,138,045 A | * | 10/2000 | Kupinski et al. | ........... 600/425 |
| 6,185,320 B1 | * | 2/2001 | Bick et al. | ................. 382/132 |
| 6,282,307 B1 | | 8/2001 | Armato, III et al. | |
| 6,335,980 B1 | * | 1/2002 | Armato et al. | .............. 382/132 |
| 6,549,646 B1 | * | 4/2003 | Yeh et al. | .................... 382/132 |
| 2001/0031920 A1 | | 10/2001 | Kaufman et al. | |
| 2002/0006216 A1 | * | 1/2002 | Armato et al. | .............. 382/131 |
| 2002/0164060 A1 | | 11/2002 | Paik et al. | |
| 2002/0164061 A1 | | 11/2002 | Paik et al. | |

OTHER PUBLICATIONS

M.L. Giger, Computerized scheme for the detection of pulmonary nodules, Proceedings of the Annual International Conference of the IEEE Engineering in Medicine and Biology Society, Nov. 9–12, 1989, vol 2, p 626–627.*
Cohen et al, Finite–element methods for active contour models and balloons for 2–D and 3–D images, IEEE Transactions on Pattern Analysis and Machine Intelligence, Nov. 1993, vol 15, iss 11, p 1131–1147.*

(Continued)

*Primary Examiner*—Bhavesh M. Mehta
*Assistant Examiner*—Christopher Sukhaphadhana
(74) *Attorney, Agent, or Firm*—Morgan Lewis & Bockius LLP

(57) ABSTRACT

An algorithm is disclosed that detects and analyzes possible lesions that are left in contact with a structural boundary. A morphological closing with a structuring element is performed along the boundary to detect lesions within the threshold of the structuring element. A deformable surface-based analysis is performed on distinctive surfaces of the structure for the identification of lesions. The integrated use of a deformable surface model and chamfer distance potential enables explicit representation of regularized, or smoothed, surfaces from which lesion candidates may be detected.

62 Claims, 10 Drawing Sheets

OTHER PUBLICATIONS

Kawata et al, Classification of pulmonary nodules in thin-section CT images based on shape characterization, International Conference on Image Processing, Oct. 26–29, 1997, vol 3, p 528–530.*

Yoshida et al, Wavelet snake for classification of nodules and false positives in digital chest radiographs, Proceedings of the International Conference of the IEEE Engineering in Medicine and Biology Society, Oct. 30 –Nov. 2, 1997, vol 2, p 509–512.*

Kanazawa et al, Computer–aided diagnosis for pulmonary nodules based on helical CT images, IEEE Nuclear Science Symposium, Nov. 9–15, 1997, vol 2, p 1635–1639.*

Kawata et al, Quantitative surface characterization of pulmonary nodules based on thin–section CT images, IEEE Nuclear Science Symposium, Nov. 9–15, 1997, vol 2, p 1218–1222.*

Yoshida et al, Computer–aided diagnosis of pulmonary nodules in chest radiographs: a wavelet–based approach, Proceedings of the IEEE Symposium on Computer–Based Medical Systems, Jun. 12–14, 1998, p 258–263.*

Kawata et al, Curvature analysis of internal structure of pulmonary nodules using thin section CT images, Proceedings of the International Conference on Image Processing, Oct. 4–7, 1998, vol 3, p 851–855.*

Kubo et al, Extraction of pulmonary fissures from HRCT images based on surface curvatures analysis and morphology filters, Proceedings of the International Conference on Pattern Recognition, Sep. 3–7, 2000, vol 1, p 490–493.*

Yongbum Lee et al, Automated detection of pulmonary nodules in helical CT images based on an improved template–matching technique, IEEE Transactions on Medical Imaging, Jul. 2001, vol 20, iss 7, p 595–604.*

Hasegawa et al., *Automated Extraction of Lung Cancer Lesions from Multislice Chest CT Images by Using Three–Dimensional Image Processing,* Systems and Computers in Japan, vol. 25, No. 11, 1994.

Lee, et al., "Pulmonary Nodule Detection in Helical X–Ray CT Images Based on an Improved Template–matching Technique," *RSNA00.*

Armato, et al., "A Computer–aided Diagnostic Method for the Detection of Lung Nodules in CT Scans," *RSNA00.*

Fetita, et al., "Three–Dimensional Reconstruction of Human Bronchial Tree in HRCT," *SPIE99.*

Jain, R., Machine Vision (McGraw–Hill 1995), pp. 61–69.

Cohen, et al., Finite Element Methods for Active Contour Models and Balloons for 2D and 3D Images, *IEEE Trans. PAMI 1993.*

Kass, et al. "Snakes, Active Contour Models," *IJCV88.*

* cited by examiner

DETECTION AND ANALYSIS OF LESIONS IN CONTACT WITH A STRUCTURAL BOUNDARY

CROSS-REFERENCE TO RELATED APPLICATIONS

This application is a continuation-in-part of application Ser. No. 09/993,789, filed Nov. 23, 2001.

Related applications are:

"Density Nodule Detection in 3-Dimensional Medical Images," Ser. No. 09/993,792 filed Nov. 23, 2001;

"Method and System for the Display of Regions of Interest in Medical Images," Ser. No. 09/990,508, filed Nov. 21, 2001;

"Vessel Segmentation with Nodule Detection," Ser. No. 09/993,791 filed Nov. 23, 2001;

"Automated Registration of 3-D Medical Scans of Similar Anatomical Structures," Ser. No. 09/993,790, filed Nov. 23, 2001;

"Lung Field Segmentation From CT Thoracic Images," Ser. No. 09/993,793, filed Nov. 23, 2001; and "Graphical User Interface for Display of Anatomical Information, " Ser. No. 09/990,511, filed Nov. 21, 2001, claiming priority from Ser. No. 60/252743 filed Nov. 22, 2000 and from Ser No. 60/314,582 filed Aug. 24, 2001.

"Region Growing in Anatomical Images," Ser. No. 10/261,182, filed concurrently herewith;

"Segmentation in Medical Images," Ser. No. 10/216,196, filed concurrently herewith; and "Graphical User Interface for Display of Anatomical Information," Ser. No. 10/261,183, filed concurrently herewith.

This application hereby incorporates by reference the entire disclosure, drawings and claims of each of the above-referenced applications as though fully set forth herein.

FIELD OF THE INVENTION

The present invention relates to detection and analysis of lesions in digital images. The invention further provides an algorithm for recovering and identifying lesions and systems for using such an algorithm as an aid to medical diagnosis and disease evaluation.

BACKGROUND OF THE INVENTION

The diagnostically superior information available from data acquired from various imaging systems, especially that provided by multidetector CT (multiple slices acquired per single rotation of the gantry) where acquisition speed and volumetric resolution provide exquisite diagnostic value, enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital acquisition systems for creating digital images include digital X-ray radiography, computed tomography ("CT") imaging, magnetic resonance imaging ("MRI") and nuclear medicine imaging techniques, such as positron emission tomography ("PET") and single photon emission computed tomography ("SPECT"). Digital images can also be created from analog images by, for example, scanning analog images, such as typical X-ray films, into a digitized form. Further information concerning digital acquisition systems is found in our above-referenced copending application "Graphical User Interface for Display of Anatomical Information".

Digital images are created from an array of numerical values representing a property (such as a radiation intensity or magnetic field strength) associable with an anatomical location referenced by a particular array location. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels.

Once in a digital or digitized format, various analytical approaches can be applied to process digital anatomical images and to detect, identify, display and highlight regions of interest (ROI). For example, digitized images can be processed through various techniques, such as segmentation. Segmentation generally involves separating irrelevant objects (for example, the background from the foreground) or extracting anatomical surfaces, structures, or regions of interest from images for the purposes of anatomical identification, diagnosis, evaluation, and volumetric measurements. Segmentation often involves classifying and processing, on a per-pixel basis, pixels of image data on the basis of one or more characteristics associable with a pixel value. For example, a pixel or voxel may be examined to determine whether it is a local maximum or minimum based on the intensities of adjacent pixels or voxels.

Once anatomical regions and structures are constructed and evaluated by analyzing pixels and/or voxels, subsequent processing and analysis exploiting regional characteristics and features can be applied to relevant areas, thus improving both accuracy and efficiency of the imaging system. For example, the segmentation of an image into distinct anatomical regions and structures provides perspectives on the spatial relationships between such regions. Segmentation also serves as an essential first stage of other tasks such as visualization and registration for temporal and cross-patient comparisons.

Key issues in digital image processing are speed and accuracy. For example, the size of a detectable tumor or nodule, such as a lung nodule, can be smaller than 2 mm in diameter. As a result, an axial section that might be used in detecting such a tumor would typically be a 512×512 array of pixels having a spatial resolution of 500 microns. Moreover, depending on the particular case, a typical volume data set can include several hundred axial sections, making the total amount of data 200 Megabytes or more. In addition, the total data set might include several volume sets, each taken at a different time. Thus, due to the sheer size of such data sets and the desire to identify small artifacts, computational efficiency and accuracy are of high priority to satisfy the throughput requirements of any digital processing method or system.

Previous work on lesion detection in digital images has some disadvantages. For example, work on nodule detection as applied to the thoracic region includes the following:

Lee et al proposed a template matching technique to detect lung wall nodules ("Pulmonary Nodule Detection in Helical X-Ray CT Images Based on an Improved Template-matching Technique", *RSNA*00; Y. Lee; T. Hara; H. Fujita; S. Itoh; T. Ishigaki; M. Tsuzaka). Semicircular models together with information on the tangent of lung wall curves were used in the matching process. This method suffers from inflexibility in dealing with the size variability of nodules.

Armato et al used a technique called rolling-ball (disk) ("A Computer-aided Diagnostic Method for the Detection of Lung Nodules in CT Scans". *RSNA*00. Samuel G. Armato et al.) In Armato, on each axial slice of digital lung images, a 2-D disk filter is successively placed tangential to points on the pleura. An indentation is identified when the disk filter contacts a contour at more than one location. Such indentation is then filled and brought back to the lung field as a pleural nodule candidate. A similar rolling-ball technique was used by Fetita in his work on bronchial tree reconstruction ("Three-Dimensional Reconstruction of Human Bronchial Tree in HRCT," *SPIE*99. C. Fetita, F. Preteux). Such a technique has difficulty optimizing the disk filter size and in controlling the spacing between test points on the pleura. It also has limitations in its extension to 3-D, and therefore does not fully exploit the smoothness of lung shapes.

It is desirable to provide systems and methods for imaging that can effectively deal with the size variability of all manner of lesions. It is further desirable to provide lesion detection systems and methods that provide accurate results for diagnosis. It is desirable to provide a lesion detection approach for registering and detecting lesions from 2-D and 3-D data sets. It is desirable to provide a lesion detection approach that can be adapted to perform on partial volumes to reduce processing loads. It is further desirable to provide a lesion detection process and system that relies on common attributes such as image edges, texture, shapes and image amplitude. It is further desirable to provide a method and apparatus for improved sensitivity and specificity in lesion detection in digital imaging to enable early and accurate diagnosis.

Methods and apparatus in accordance with embodiments of this invention overcome the foregoing and other problems.

SUMMARY OF THE INVENTION

The present invention is directed to a method for detecting lesions that exploits various analytical techniques, including morphological closing and surface fitting and regularization with deformable models. An algorithm of the present invention detects and analyzes possible lesions that are in contact with a structural boundary. The algorithm uses a morphological closing with a structuring element that is performed along the boundary to detect lesions within the structuring element. Next, a deformable surface-based analysis is performed on distinctive surfaces of the structure for the identification of larger lesions.

An especially useful application of the invention is in the detection of pleural nodules and the invention will be described in that context.

BRIEF DESCRIPTION OF THE FIGURES

These and other objects and advantages of the present invention will be more readily apparent from the following detailed description of a preferred embodiment of the invention in which:

FIG. 1(*b*) depicts the result of lung field segmentation of the same axial section as in FIG. 1(*a*);

FIG. 5(*b*) depicts the initialization of the deformable surface fitting in 3-D view;

FIG. 5(*c*) depicts a deformable surface fitting after deformation achieving a balance between smoothness and faithfulness to the original pleura;

FIG. 5(*d*) depicts a recovered lung field on the same axial image section as in 4(*a*), with nodule candidate indicated with a circle;

FIG. 6(*b*) depicts a pleural nodule candidate on a lung base, indicated with a circle and identified in an axial section and in a corresponding recovered lung field image;

FIG. 6(*c*) depicts a pleural nodule candidate on a mediastinal surface, indicated with a circle and identified in an axial section and in a corresponding recovered lung field image; and FIG. 6(*d*) depicts a pleural nodule candidate on an anterior lung border, indicated with a circle and identified in an axial section and in a corresponding recovered lung field image.

DETAILED DESCRIPTION OF THE INVENTION

Figure 1A:
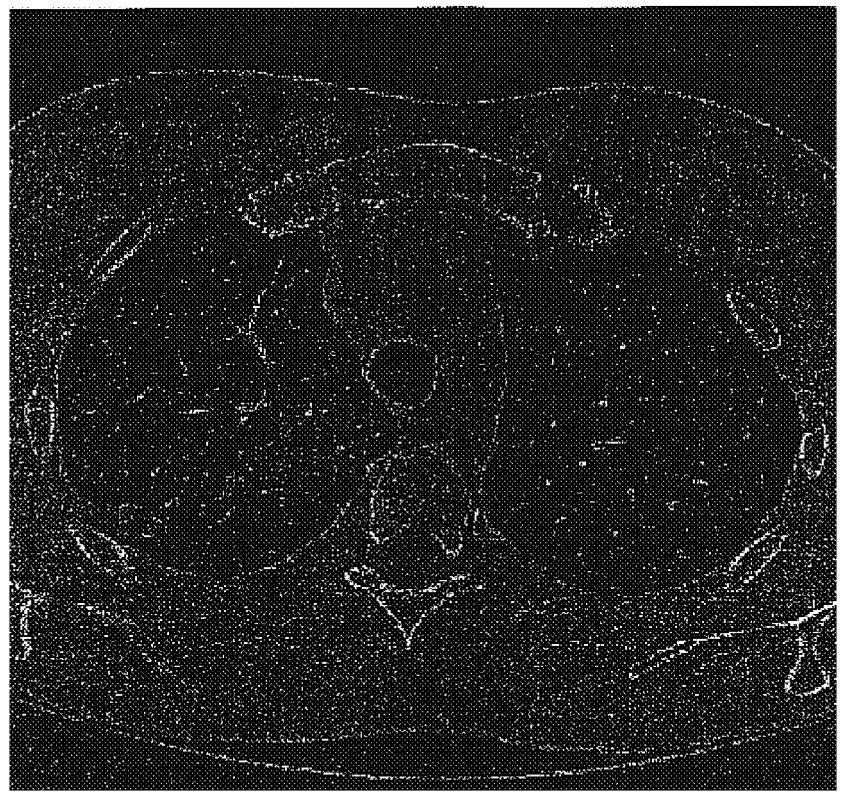
FIG. 1(*a*) depicts an axial section of a CT thoracic image volume.
Figure 1B:
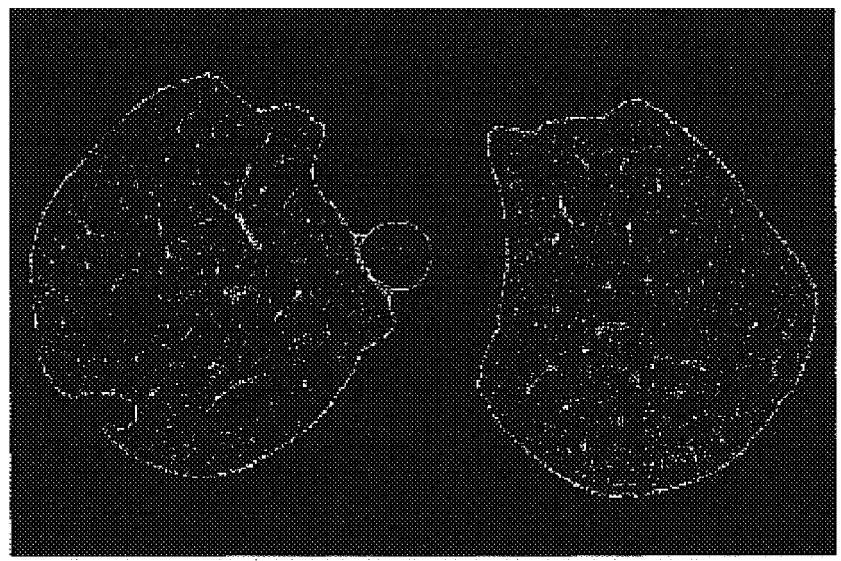

The present invention is preferably performed on a computer system, such as a Pentium™-class personal computer, running computer software that implements the algorithm of the present invention. The computer includes a processor, a memory and various input/output means. A series of CT axial or other digital images representative of a portion of the body are input to the computer. Illustratively, the portion of the body that is of interest is the thoracic volume; and examples of digital images or sections of the thoracic volume are shown in FIGS. 1(*a*) and 1(*b*). The terms "digital" and "digitized" as used herein will refer to images or volumes, as appropriate, in a digital or digitized format acquired via a digital acquisition system or via conversion from an analog image.

The present invention provides for systems and methods capable of effective and accurate lesion detection from 2-D and 3-D digital images. The digital image sections to be processed, rendered, displayed or otherwise used include digitized images acquired through any plane, including, without limitation, saggital, coronal and axial (or horizontal, transverse) planes and including planes at various angles to the saggital, coronal or axial planes. While the disclosure may refer to a particular plane or section, such as an axial section or plane, it is to be understood that any reference to a particular plane is not necessarily intended to be limited to that particular plane, as the invention can apply to any plane or planar orientation acquired by any digital acquisition system.

While the invention is described for the example of nodule detection in thoracic images, the methods and systems disclosed herein can be adapted to other organs or anatomical regions including, without limitation, the heart, brain, spinal, colon, liver and kidney systems. The software application and algorithm disclosed herein can employ 2-D and 3-D renderings and images of an organ or organ system.

As used herein, the term "pleural nodules" refers to nodules that are based on pleura such as costal pleura and mediastinal pleura. Nodules that reside on interlobular fissures are not within the scope of this application. Pleural nodules have the appearance of protrusions from pleura, and can be identified as violations of the natural smoothness presented by the overall conical shape of lungs. Based on this characteristic, the problem of pleural nodule detection becomes one of pleural surface extraction and regularization, particularly in smoothness. The invention may also be practiced on other violations of naturally smooth body surfaces whether the violation constitutes a protrusion or an indentation.

The anatomy of the lungs provides an excellent guideline for surface analysis, particularly given the general characteristics of lungs. For example, each lung is generally conical in shape, and presents for examination an apex, a base, three borders (inferior border, posterior border and anterior border) and two surfaces (costal surface and mediastinal surface). The problem of pleural surface analysis in thoracic volume can be dissected into surface fittings in four types, so as to reduce the complexity of the problem.

Apex: The apex is rounded, and extends into the root of the neck, reaching from 2.5 to 4 mm.

Costal surface and posterior border: Costal surface is smooth, convex and corresponds to the form of the cavity of the chest. Posterior border is rounded and is received into the deep concavity of either side of the vertebral column. The deformable surface is preferably initialized piece-wise linearly with landmark points on consecutive axial image sections, and deformed outward to fit the pleural boundary.

Lung base and inferior border: The lung base is broad, concave and rests upon the convex surface of the diaphragm. A deformable surface model can be conveniently initialized, for example, with landmark points on reconstructed saggital image sections on inferior borders.

Mediastinal surface and anterior border: In contact with the mediastinal pleura, mediastinal surface presents a deep concavity of cardiac compression. The anterior border is thin and sharp, and overlaps the front of the pericardium. The deformable surface model can also be conveniently initialized with landmark points on reconstructed saggital image sections for this fitting.

The present invention involves two techniques of preprocessing: morphological closing for detecting smaller nodules and surface fitting and regularization with deformable models for recovering larger nodules. For the case of lungs, such nodules are pleural nodules.

Figure 2:
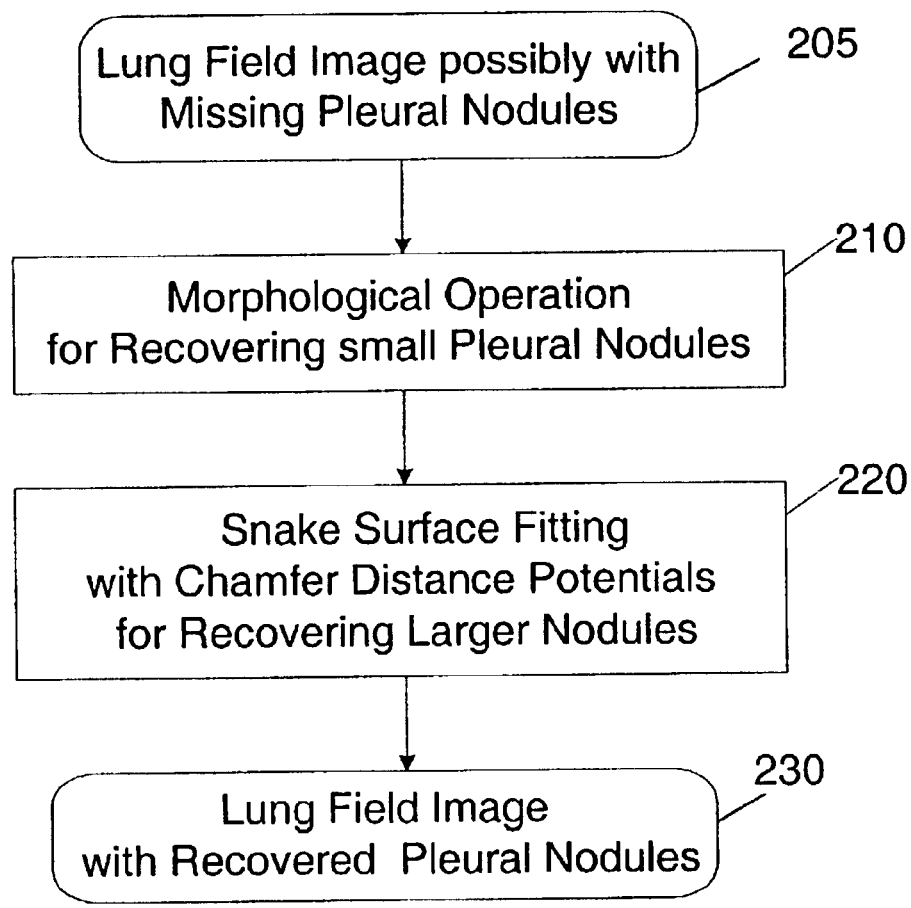
FIG. 2 is a flow chart depicting a preferred algorithm for pleural nodule detection through morphological operations and surface regularization.

FIG. 2 is a flow chart depicting a preferred algorithm for pleural nodule detection through surface regularization. The algorithm operates on slice sections and digital image volumes constructed from stacked slice sections through various construction techniques and methods known in the art. An image, and any resulting image volume, may be subject to noise and interference from several sources including sensor noise, film-grain noise and channel errors. Optional, but preferable, noise reduction and cleaning are initially performed on the image volume. Various statistical filtering techniques can reduce noise effects, including various known linear and non-linear noise cleaning or processing techniques. For example, a noise reduction filter employing a Gaussian smoothing operation can be applied to the whole image volume or partial image volume to reduce the graininess of the image.

The algorithm begins at step 205 with a series of digital lung field images. The lung field images preferably have been segmented and processed so as to identify and process the lung field, pleural boundary and other thoracic regions in accordance, for example, with application Ser. No. 09/993,793 for "Lung Field Segmentation from CT Thoracic Images", filed Nov. 23, 2001 and incorporated herein). Such processing may also have removed from the image certain image information relating to pleural nodules.

In accordance with the present invention, a morphological operation is performed at step 210 on a digital lung field image volume to recover small pleural nodules. Morphology allows for filtering and/or enhancing only some characteristics of objects, depending on their morphological shape. A morphological filter depends on its structuring element, a small, quasi image that defines the operational neighborhood of a pixel. In a preferred embodiment of the invention, the structuring element is chosen to be an ellipsoid. The morphological operation known as morphological closing "closes" gaps in and between image objects. In morphological closing, a known morphological dilation operation is followed by a known morphological erosion operation. Closing the lung field images with an ellipsoidal structuring element smoothes the lung surface, fuses narrow breaks and thin gulfs and eliminates holes smaller in size than the ellipsoidal structuring element. Consequently, pleural nodules smaller than the size of the structuring element are recovered in the lung field images by taking the difference between the original digital lung field image volume and the closed lung field image. Since morphological closing is a generic operation, it does not involve error-prone numerical calculations and is quite effective and robust. Further information on morphological operation is found in R. Jain, *Machine Vision*, (McGraw Hill 1995) at pages 61–69, which are incorporated herein by reference.

After the morphological operation is performed at step 210 to recover and detect the smaller nodules, a deformable surface fitting with chamfer distance potential analysis is performed at step 220 to detect and recover larger nodules. A lung field image with recovered small and large nodules is then produced and displayed at step 230.

Figure 3:
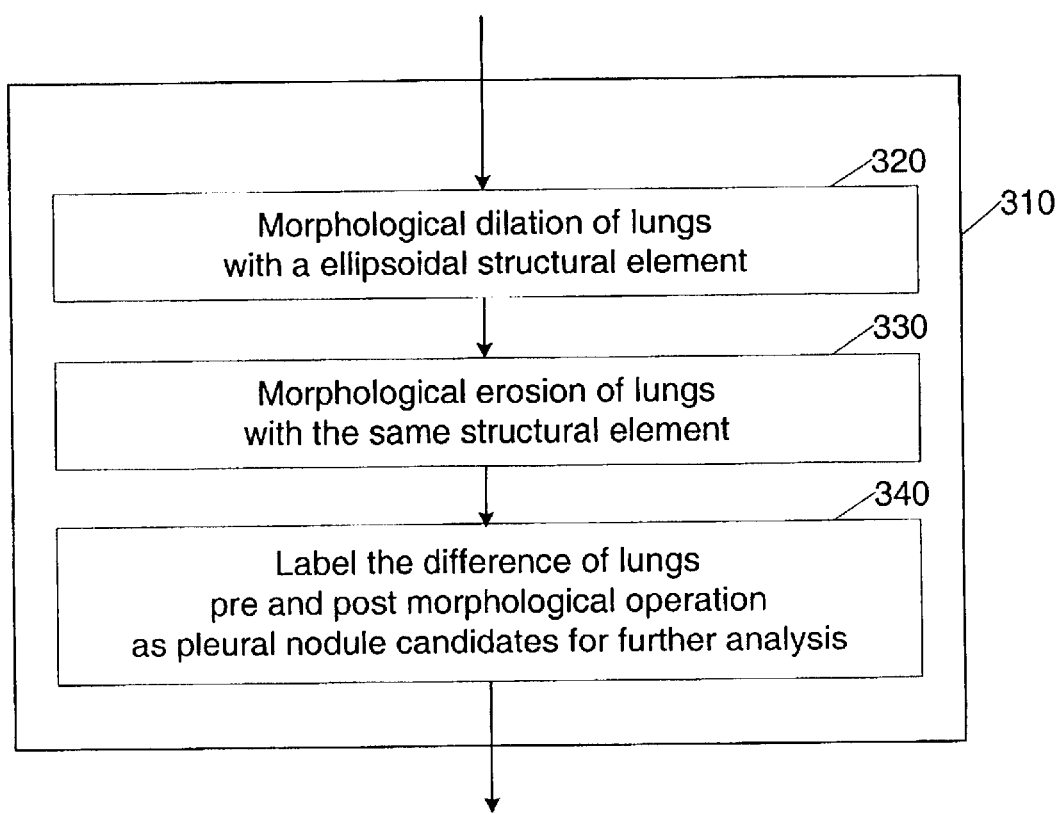
FIG. 3 is a flow chart depicting a preferred algorithm for the morphological operation.

Details of one morphological dilation and erosion operation 310 are provided in FIG. 3. At step 320, a morphological dilation of the lung field image is performed using an ellipsoidal structuring element. The size of the ellipsoidal structuring element is chosen with attention to sensitivity of the process and computational burden. For purposes of detecting small pleural nodules and maintaining reasonable processing efficiency, an ellipsoid is selected that is effectively a sphere with a radius in the range of 2 to 4 millimeters (mm.) and preferably with a radius of 3 mm.

At step 330 a morphological erosion of the lungs is performed.

Next, the difference between the image volume before the morphological operation and the image volume after the morphological operation is determined and labelled or otherwise identified or highlighted at step 340. These regions of difference in the lung image volumes are identified as pleural nodule candidates for further analysis.

In some embodiments, multiple morphological closing operations may be performed using structuring elements of different sizes. For example, for one such closing operation, the structuring element can be a sphere having a radius of 2 mm.; and for a second operation, the structuring element can be a sphere having a radius of 4 mm.

To detect larger nodules, a deformable surface model is used at step 220. The deformation begins with an initialization of the model via the landmarks associated with the lung or other organ. The basic idea is to explicitly extract known organ surfaces, such as lung surfaces. Thereafter, surface regularization and smoothing processes are applied to recover regions of pleural nodules that are lost in the lung field segmentation. This approach is preferably implemented using a surface fitting mechanism with a deformable surface model and a chamfer distance potential.

One illustrative approach using the chamfer distance potential technique is to search for a suitable match between two binary images: a candidate image and a reference image based on prior knowledge of object geometry. A distance map is generally created associating each pixel or voxel of the reference image with its distance from the closest profile pixel or voxel in the candidate image. The goal is to reduce an overall global distance that is a function of the sum of pixel-to-pixel or voxel-to-voxel distances. The candidate image is not directly superimposed on the reference image. Rather, the candidate image is preferably compensated via various geometric transformations, e.g., translations along x- and y-axes, rotation effects. A set of parameters is selected for the organ from which the global distance is computed or compared against, and the best fit is determined by minimizing a global distance function. The residual distance between the best compensated and the reference profiles can be used to determine whether an appropriate matching or comparison has occurred. As is known in the art, other measures than distance can also be used to determine the best fit between the deformable surface model and the voxels at the lung surfaces.

Deformable contour and surface models have been widely used in image segmentation. ("Snakes: Active Contour Models". IJCV88. M. Kass, A. Witkin and D. Terzopoulos; "Finite Element Methods for Active Contour Models and Balloons for 2D and 3D Images." *IEEE Trans. PAMI* 93. L. D. Cohen and I. Cohen.) In general, a deformable surface model is an energy-minimizing parameterized surface whose deformation in image space is driven by two forces—an external force that guides the surface toward the feature of interest, and an internal force that controls surface smoothness. The feature of interest in the present application is boundaries of the lung field. The external force in the present application is derived from chamfer distance potential instead of image gradient as in many applications of deformable models.

Figure 4:
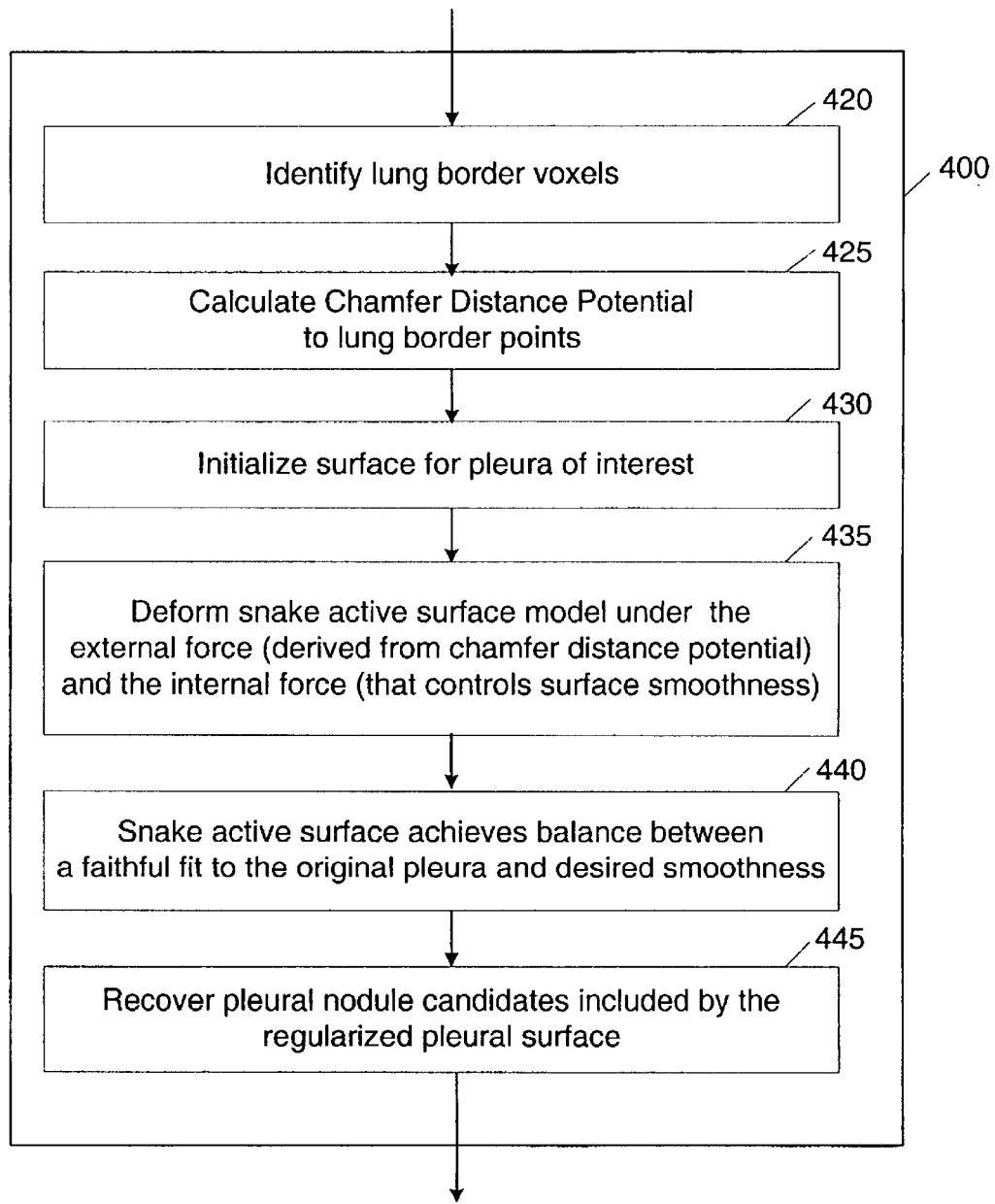
FIG. 4 is a flow chart depicting a preferred algorithm for surface regularization.
Figure 5A:
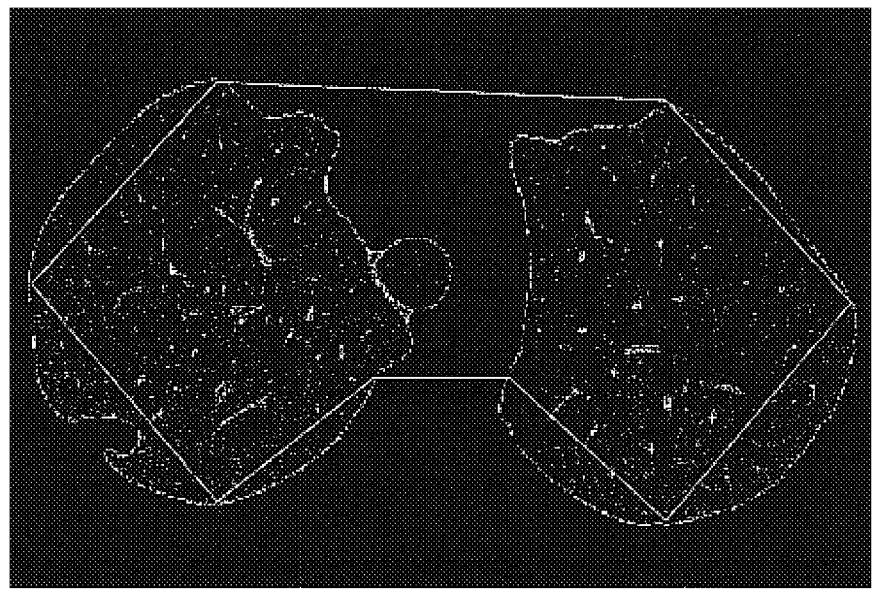
FIG. 5(*a*) depicts a deformable surface fitting model capturing costal pleura and posterior border for nodule detection.
Figure 5B:
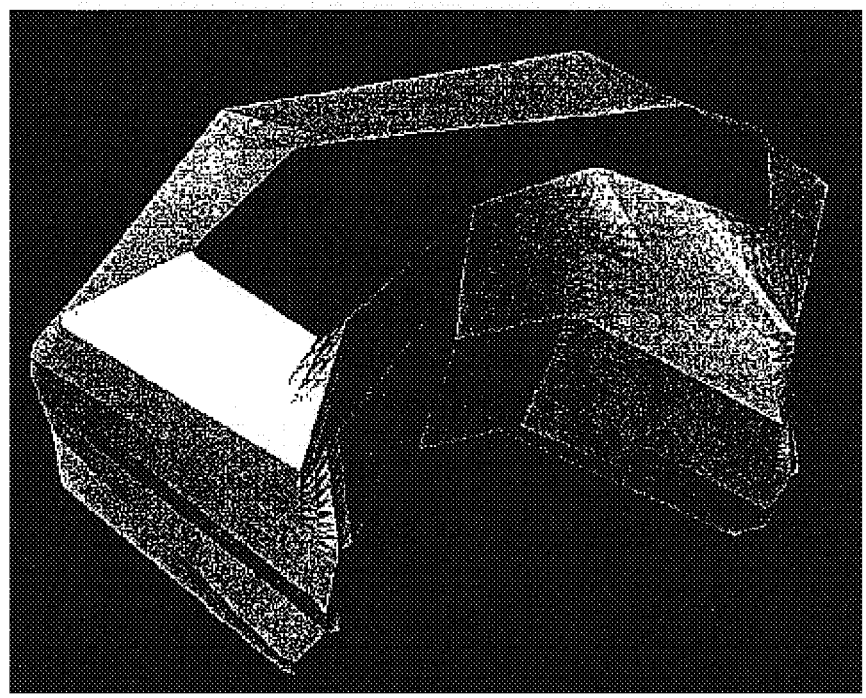
Figure 5C:
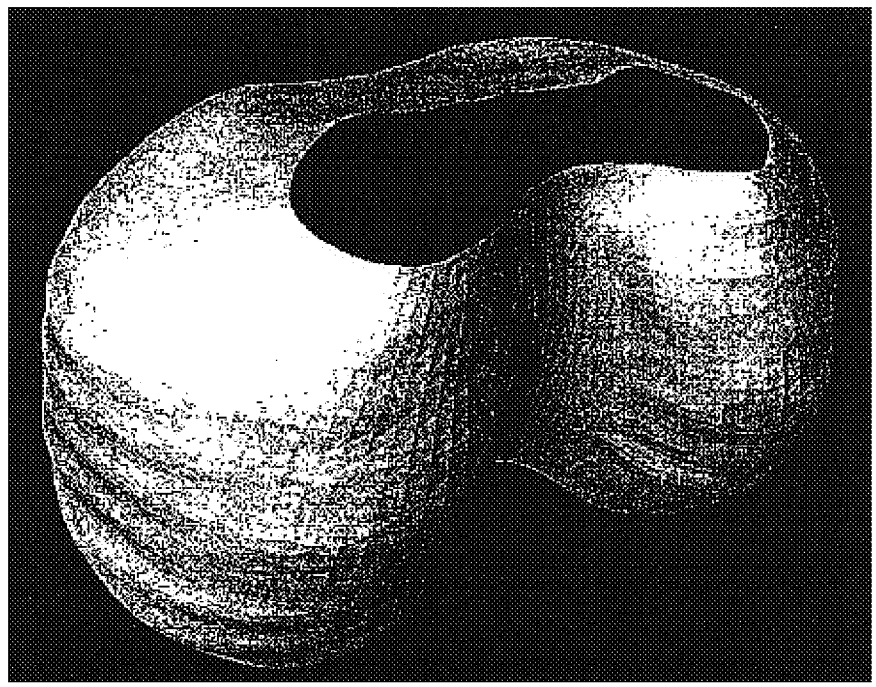
Figure 5D:
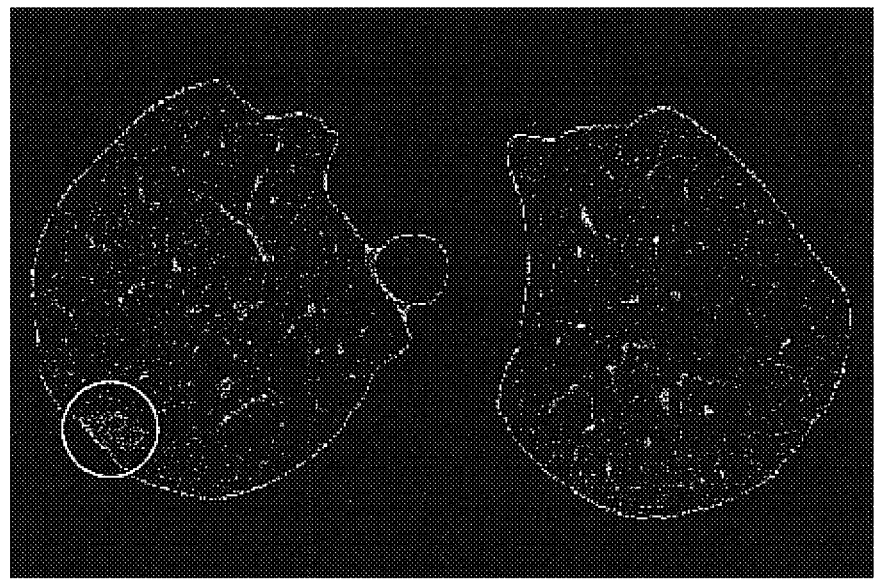

One use of a chamfer distance potential is as a measure of how close the deformable surface-fitting model is to the boundary of an organ volume. Chamfer distance is an approximation of Euclidean distance, and can be computed very efficiently with recursive operations. Further details of such a process 400 are shown in FIG. 4. At step 420, the algorithm identifies lung border voxels and at step 425 computes for each voxel in an image volume its chamfer distance to the nearest lung boundary point from the extracted lung field images. This computation of chamfer distance potential takes place only once before surface fitting.

In segmentation processsses not involving lung shape analysis, large pleural nodules that show as prominent protrusions from the pleura are often lost due to their similarity in intensity to body volume. To ensure that such pleural nodules are included in the lung field, the pleura smoothness and other surfaces of interest are initialized at step 430. A deformable surface model is used to fit to the lung field boundary at 435. After a balance between the desired smoothness and a faithful fit to the pleura is achieved at 440, pleural nodule candidates are recovered at 445 by forming the difference between the image volume before deforming the surface model and the image volume after fitting the surface model to the lung field.

Deformable surface-fitting capturing costal pleura and a posterior border for nodule detection are depicted in FIGS. 5(*a*)–(*d*). For the figures, the apex of the lungs is not included in any of the surface models, but the front of the pericardium is included. FIG. 5(*a*) shows the initialization of a deformable surface of an axial image section in accordance with step 430. A 3-D initialization of the deformable surface is depicted in FIG. 5(*b*). FIG. 5(*c*) is a representation of the deformable surface after deformation in accordance with step 440. The representation balances smoothness and faithfulness to the original pleura based on a chamfer distance potential and threshold. Approximately 6000 points on the surface were used in processing. Such a resolution results in acceptable results in the image. For example, the slight grooves on the surface correspond to overlying ribs. Recovery of nodule candidates in accordance with step 445 is represented by FIG. 5(*d*). A recovered lung field on the same axial image section as in (a) is shown in FIG. 5(*d*) with a pleural nodule candidate indicated by the circle. Further information and approaches regarding nodule detection and identification in 2-D and 3-D images is described, for example, in "Density Nodule Detection in 3-Dimensional Medical Images" referenced above.

Figure 6:
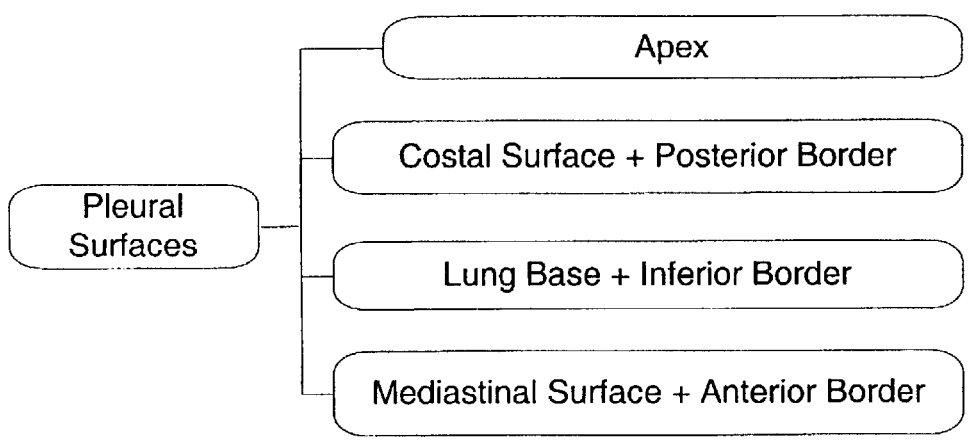
FIG. 6(*a*) depicts the dissection of pleural surfaces using anatomical guidelines for nodule analysis.
Figure 6B:
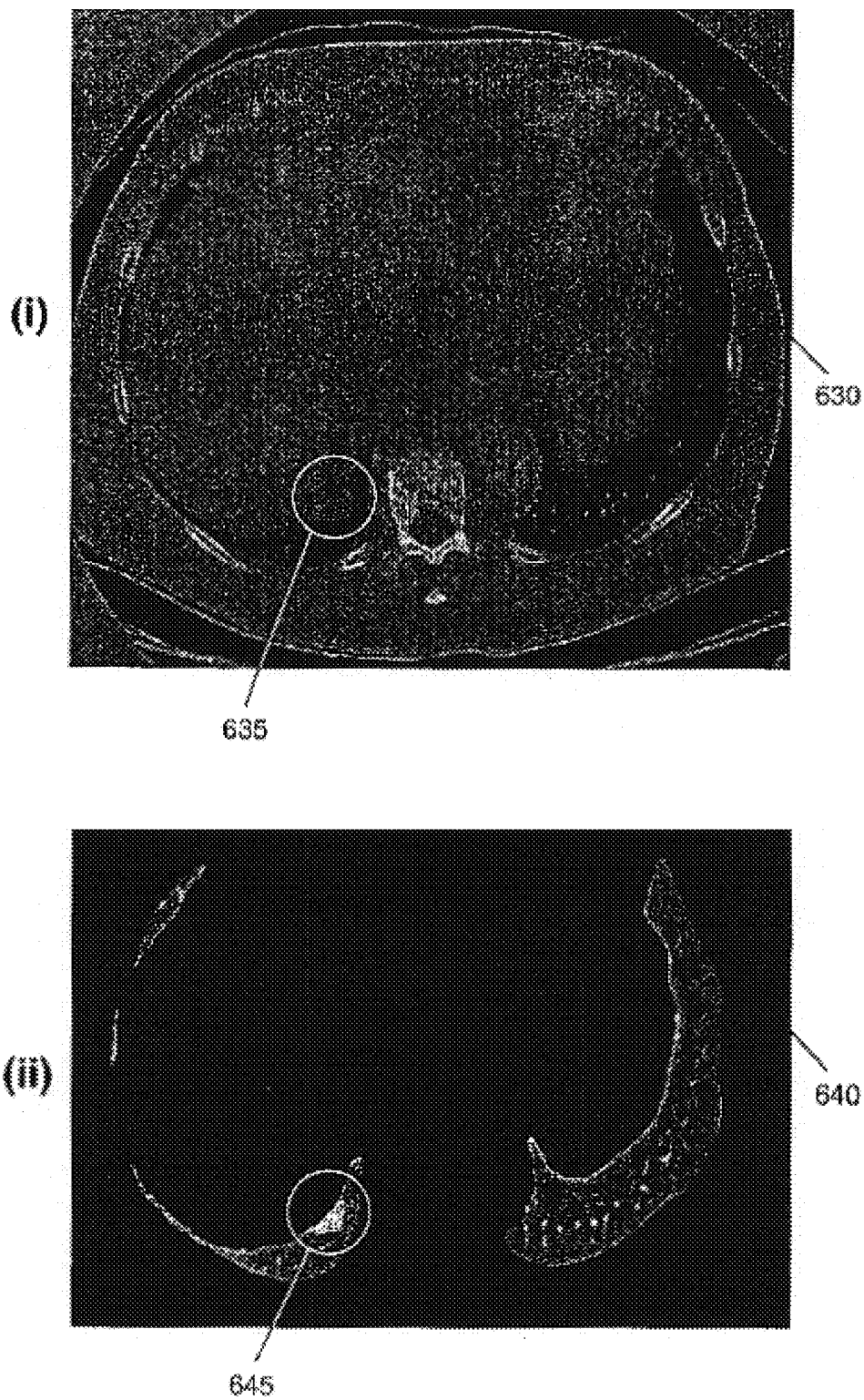
Figure 6C:
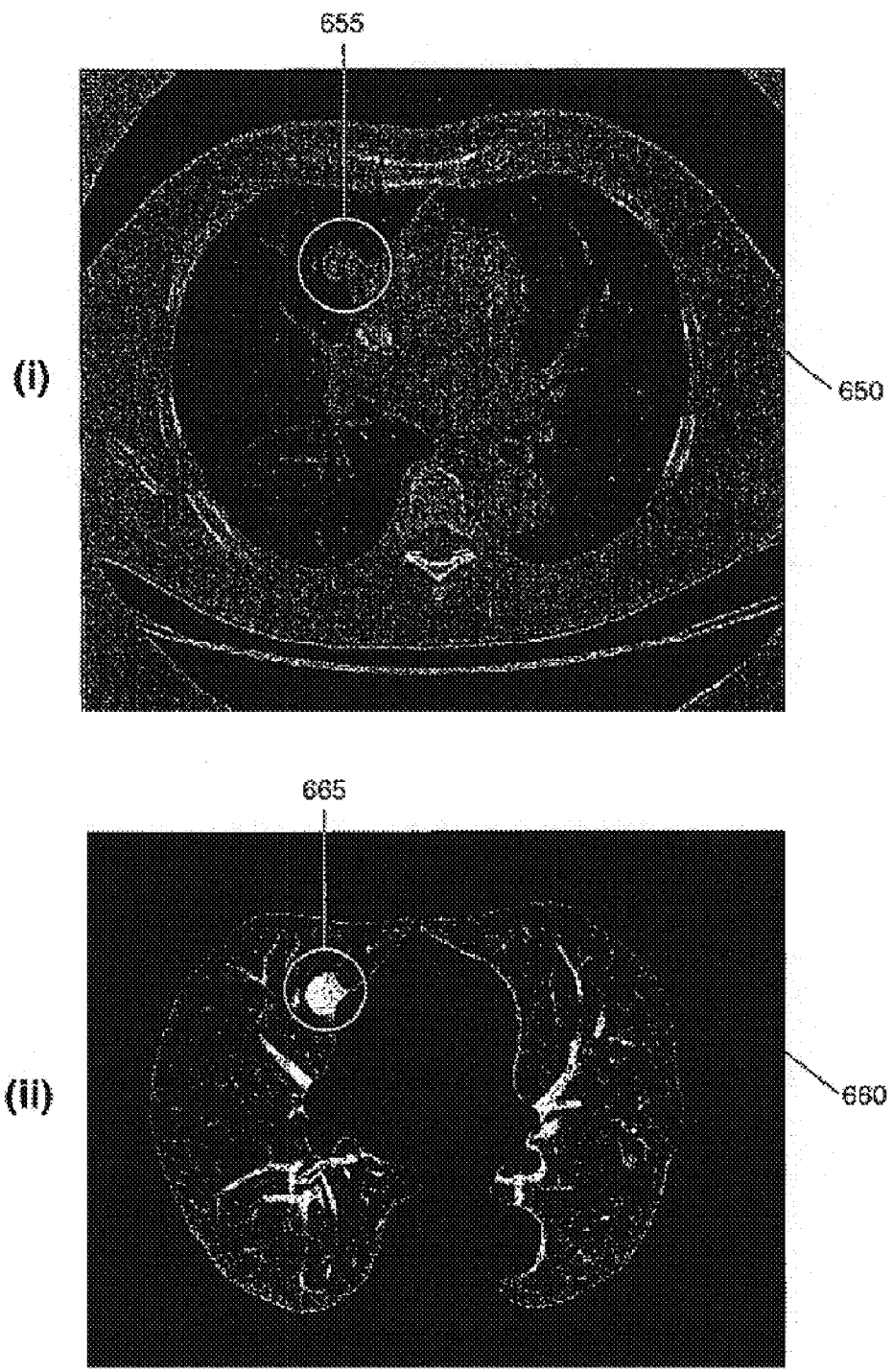
Figure 6D:
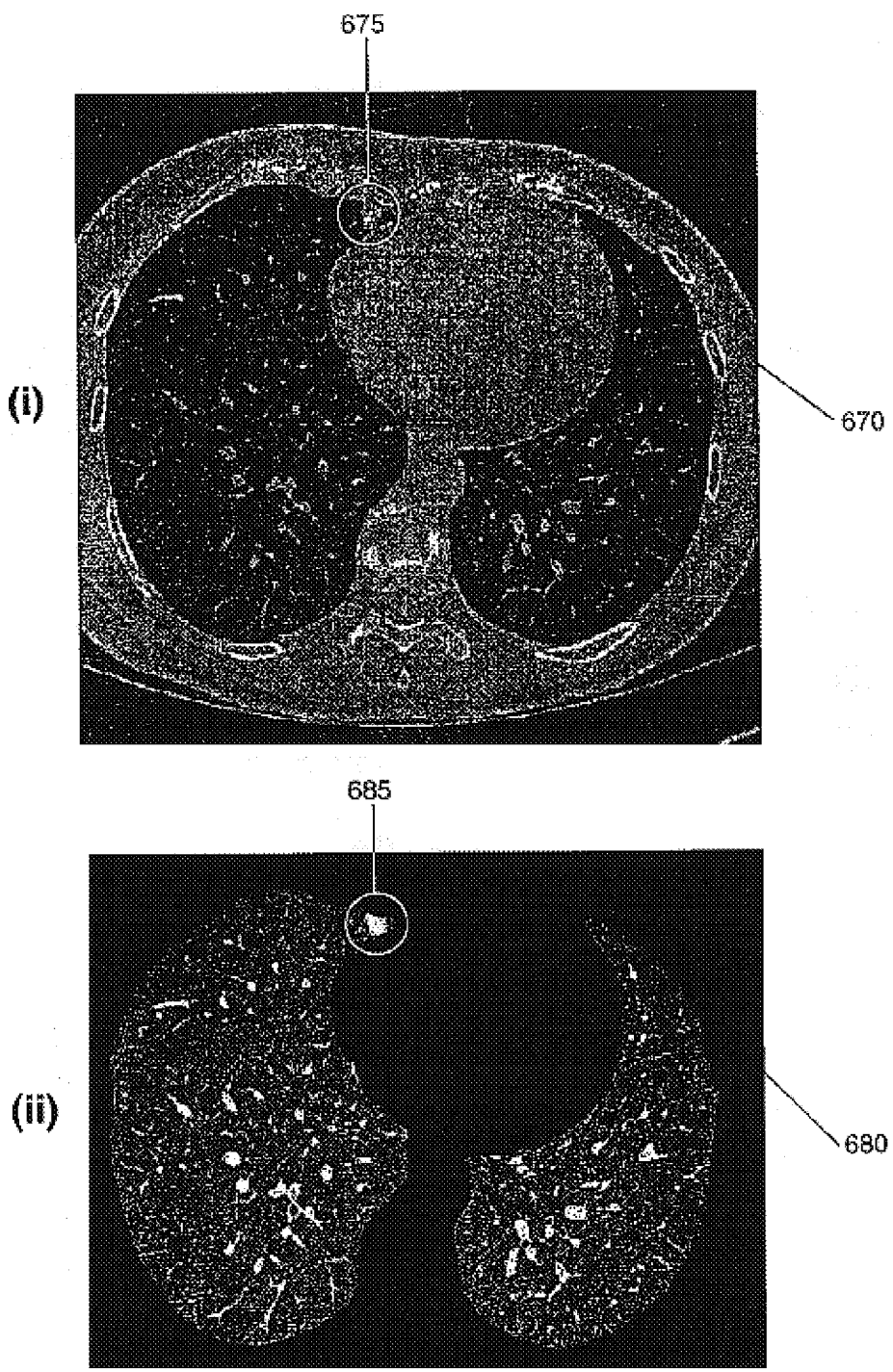

FIGS. 6(*b*)–(*d*) depict pleural nodule candidates indicated with circles and identified in axial sections and in corresponding recovered lung field images processed by the algorithms disclosed herein. Each figure highlights a candidate nodule in a recovered lung field that may or may not be cancerous. However, as can be seen in FIGS. 6(*b*)–(*d*), the candidates nodules 645, 665, and 685 in their respective recovered image 640, 660, and 680 are more easily seen as compared to their corresponding image 635, 655, and 675 in original axial images 630, 650, and 670, respectively. The various candidate nodules can be shown highlighted in the recovered lung field images or in the axial sections for ease in identification. Moreover, recovered lung field images can be displayed alongside corresponding axial sections for ease in comparison. Various nodule highlighting systems and methods and various display configurations can be found in copending applications "Graphical User Interface for Display of Anatomical Information," Ser. No. 09/990,511, filed Nov. 21, 2001, which has been incorporated by reference above.

For purposes of providing further details regarding the nodule detection algorithm disclosed herein, the following notations can be adopted for illustration:

S(u,v) denotes a parameterized deformable surface, (u,v) [0,1]x[0,1];

I denotes an image domain, and (x,y,z) denotes a voxel within I;

C denotes a chamfer distance potential on J;

N(u,v) denotes the outward normal direction of S(u,v).

The energy of the deformable surface model is defined as:

$$\text{Energy} = E_{smooth} + E_{boundary} \quad (1)$$

$$= \int_\Omega [a(|S_u|^2 + |S_v|^2) + C] du dv$$

The first term in the function of Eqn. (1) is the internal energy that penalizes the unsmoothness of the deformable surface, and the second term is the external chamfer distance potential which draws the deformable surface right onto the pleural boundary. Minimizing the energy function above simulates the process of balancing between the two energies, resulting in a good surface fit with desired smoothness.

In general the surface deformation along tangent directions affects only surface parameterization and does not affect surface spatial location. If the surface deformation along tangent directions is ignored, the following equation can be derived from Equation (1) for the update of the surface model:

$$\frac{\partial S(u,v)}{\partial t} = F_{smooth} + F_{boundary} \quad (2)$$
$$= a(S_{uu} + S_{vv}) + (\nabla C \cdot N(u,v))N(u,v)$$

Given an initialization of the deformable surface, the above equation can be solved iteratively until the deformation of surface is within a pre-set threshold. Regions that become included inside the resulting relaxed surface are recovered into the lung field, and are used as candidates for further feature analysis and for the detection of nodules.

In the case of processing a single image section, or when inter-slice image smoothness is not significant (e.g. for images with large thickness), the above surface model can be simplified into a curve model for in-slice processing by retaining only the in-slice parameterization and smoothness constraint.

The algorithm described herein is operable on various data acquisition systems such as comupter tomography (CT), magnetic resonance imaging (MRI), positron emission tomography (PET) and single photon emission computed tomography (SPECT). Advantageously, the method is implemented in computer software that is stored in an appropriate medium and runs on a suitable computer; and the software includes logic code for implementing the steps of the method of the present invention. While the invention has been illustrated for thoracic image processing and the thoracic anatomy and the nature of lung images, the same principles may be employed to detect departures such as protrusions or indentations from the natural smoothness of surfaces of other parts of the body such as the heart, brain, spine, colon, liver and kidney systems. For example, the invention may also be used to detect polyps in the colon.

In this application, an efficient method for lesion detection from digital images is presented. The invention provides a method that is accurate, efficient, flexible and detects lesions that prior systems and approaches overlook or are incapable of detecting. The foregoing examples illustrate certain exemplary embodiments of the invention from which other obvious embodiments, variations, and modifications will be apparent to those skilled in the art. The invention should therefore not be limited to the particular embodiments discussed above, but rather is defined by the claims. While we described our method as it would specifically apply to the detection of pleural nodules in digital or digitized thoracic volumes, the present invention also applies to other organ and organ regions.

What is claimed is:

1. A method of recovering from digital images lesions in contact with a boundary of an anatomical structure comprising:
    performing a morphological operation at the boundary of the anatomical structure to identify lesions smaller than a first threshold size; and
    performing a surface-regularization operation on at least one surface of the structure to identify lesions.

2. The method of claim 1 wherein the surface-regularization operation detects lesions larger than a second threshold size.

3. The method of claim 2 wherein the first and second threshold sizes are the same.

4. The method of claim 2 wherein the second threshold size is larger than the first threshold size.

5. The method of claim 2 wherein the second threshold size is smaller than the first threshold size.

6. The method of claim 1 wherein the anatomical structure is a lung field.

7. The method of claim 1 wherein the anatomical structure is a heart, brain, spine, colon, liver or kidney.

8. The method of claim 1 wherein the boundary at which the morphological operation is performed is a boundary of a digital volume constructed from the digital images.

9. The method of claim 8 wherein the boundary at which the morphological operation is performed is selected after segmenting the digital volume.

10. The method of claim 9 wherein segmenting the digital volume further includes identifying a lung field region.

11. The method of claim 9 wherein segmenting the digital volume further includes identifying a pleural boundary.

12. The method of claim 9 wherein segmenting the digital volume further includes identifying a lobe of a lung.

13. The method of claim 1 wherein the boundary at which the morphological operation is performed is selected after segmenting one or more of the digital images.

14. The method of claim 1 further including segmenting one or more of the digital images to identify surfaces for surface fitting and regularization in smoothness.

15. The method of claim 1 further including segmenting a digital volume created from the digital images to identify surfaces on which to perform the surface-regularization operation.

16. The method of claim 15 wherein the surface-regularization operation is performed on a lung surface.

17. The method of claim 16 wherein the lung surface is a lung apex, a costal surface and posterior border, a lung base, or a mediastinal surface and anterior border.

18. The method of claim 1 wherein the surface-regularization operation includes surface-fitting and regularization in smoothness with deformable models.

19. The method of claim 18 wherein the surface-fitting with deformable models is initialized using landmark points from a section of one or more digital images.

20. The method of claim 19 wherein the landmark points identify a lung apex, a costal surface and posterior border, a lung base, or a mediastinal surface and anterior border.

21. The method of claim 1 wherein performing a morphological operation at the boundary of the anatomical structure further includes:
    performing a morphological dilation at the boundary with a structuring element; and
    performing morphological erosion at the boundary with the structuring element.

22. The method of claim 21 wherein the structuring element is ellipsoidal.

23. The method of claim 21 wherein the structuring element is spherical.

24. The method of claim 23 wherein the spherical structuring element has a radius of approximately 3 millimeters.

25. The method of claim 23 wherein the structuring element has a radius of 2 to 4 millimeters.

26. The method of claim 23 wherein the first threshold size is the radius of the structuring element.

27. The method of claim 1 wherein the first threshold size is 3 millimeters.

28. The method of claim 1 further including displaying one of the digital images, said digital image having a location associated with an area corresponding to a location identified by the morphological operation or the surface-regularization operation.

29. The method of claim 28 wherein the displayed image includes one or more highlighted abnormalities.

30. The method of claim 29 wherein displaying a digital image further includes displaying at least one of the digital images of the anatomical structure, said at least one of the digital images of the anatomical structure being a digital image not processed by the morphological operation or surface-regularization operation and containing anatomical information associated with anatomical information of the displayed digital image.

31. The method of claim 30 wherein the digital image of the anatomical structure displayed is shown with a highlighted location, said highlighted location associated with one or more of the highlighted abnormalities in the displayed digital image.

32. The method of claim 1 further including displaying one of the digital images, said digital image having a location associated with an area corresponding to a location identified by the morphological operation or the surface-regularization operation.

33. The method of claim 1 further including displaying a post-processed digital image volume, said post-processed digital image volume constructed from digital images identified as containing anatomical information identified by the morphological operation or the surface-regularization operation.

34. The method of claim 1 further including the step of performing noise reduction on the digital images.

35. The method of claim 1 further including the step of performing noise reduction on a digital volume constructed from some or all of the digital images.

36. The method of claim 1 wherein the step of performing a morphological operation is performed on a digital lung field image.

37. The method of claim 1 wherein an abnormality identified by the morphological operation or the surface-regularization operation is a pleural nodule.

38. The method of claim 1 wherein a surface-regularization operation is performed using a deformable surface model to fit a surface to a boundary.

39. The method of claim 38 wherein the deformable surface model uses a chamfer distance potential as a measure of the proximity of the deformable surface model to the boundary.

40. The method of claim 1 wherein the surface of the structure upon which surface-regularization operation is performed is a pleural surface.

41. The method of claim 1 wherein performing a surface-regularization operation requires fitting a pleural surface to a boundary.

42. The method of claim 41 wherein the boundary is a pleural boundary.

43. The method of claim 1 wherein performing a surface-regularization operation on at least one surface further includes:
    identifying border voxels;
    calculating a potential to the border voxels;
    initializing the surface; and
    deforming a deformable surface model under an external force and under an internal force.

44. The method of claim 43 wherein the potential is a chamfer distance potential.

45. The method of claim 43 wherein the external force is based on a chamfer distance potential.

46. The method of claim 43 wherein the internal force is based on a smoothness determination of the surface.

47. The method of claim 43 wherein the surface includes a costal surface and a posterior border of the lungs.

48. The method of claim 43 wherein the surface is a base of the lungs.

49. The method of claim 43 wherein the surface includes a mediastinal surface of the lungs and an anterior border of the lungs.

50. The method of claim 43 wherein the surface includes a lung apex.

51. The method of claim 1 further including highlighting abnormalities in the digital images corresponding to abnormalities identified by the morphological operation or by the surface-regularization operation.

52. The method of claim 1 further including highlighting abnormalities in a digital volume constructed from digital images corresponding to abnormalities identified by the morphological operation or by the surface-regularization operation.

53. The method of claim 1 wherein the lesion is a protrusion from the boundary of the anatomical structure.

54. The method of claim 1 wherein the lesion is an indentation in the boundary of the anatomical structure.

55. The method of claim 1 wherein the digital images are formed by computer tomography, magnetic resonance imaging, positron emission tomography or single photon emission computer tomography.

56. A method of recovering from digital images lesions in contact with a boundary of an anatomical structure comprising:
    recovering lesions having a size below a first threshold by performing a morphological operation at the boundary of the anatomical structure comprising:
        performing a morphological dilation at the boundary with a structuring element selected to be capable of detecting lesions having a size below the first threshold; and
    performing morphological erosion at the boundary with the structuring element; and
    performing a surface-regularization operation on at least one surface of the structure to identify lesions comprising:
        identifying border voxels;
        calculating a potential to the border voxels;
        initializing the surface; and
        deforming a deformable surface model under an external force and under an internal force.

57. The method of claim 56 wherein the potential is a chamfer distance potential.

58. The method of claim 56 wherein the external force is based on a chamfer distance potential.

59. The method of claim 56 wherein the internal force is based on a smoothness determination of the surface.

60. The method of claim 56 wherein the surface is a lung apex, a costal surface and posterior border, a lung base, or a mediastinal surface and anterior border.

61. A method of recovering from digital image pleural nodules comprising:
    performing a morphological operation on pleural surfaces to identify nodules smaller than a first size; and
    performing a surface-regularization operation on at least one pleural surface to identify other nodules.

62. In a recording medium, software for recovering from digital images lesions in contact with a boundary of an anatomical structure comprising:
    logic code for performing a morphological operation at the boundary of the anatomical structure to identify lesions having a size smaller than a first threshold; and
    logic code for performing a surface-regularization operation on at least one surface of the structure to identify abnormalities.

* * * * *